(No Model.)  6 Sheets—Sheet 1.

J. R. SEVERANCE.
GRAIN BINDER.

No. 452,460.  Patented May 19, 1891.

Fig. 1.

Witnesses:
Theo. L. Popp
Jos. La Croix.

James R. Severance,
Inventor.
By Geo. B. Selden,
Attorney.

(No Model.) 6 Sheets—Sheet 2.
J. R. SEVERANCE.
GRAIN BINDER.

No. 452,460. Patented May 19, 1891.

Fig. 2.

Witnesses:
Theo. L. Popp
Jos. Labroif.

James R. Severance,
Inventor.
By Geo. B. Selden,
Attorney.

(No Model.) 6 Sheets—Sheet 3.

J. R. SEVERANCE.
GRAIN BINDER.

No. 452,460. Patented May 19, 1891.

Fig. 3.

Witnesses:
Theo. L. Popp
Jos. La Croix

James R. Severance,
Inventor.
By Geo. B. Selden,
Attorney.

(No Model.) 6 Sheets—Sheet 4.

J. R. SEVERANCE.
GRAIN BINDER.

No. 452,460. Patented May 19, 1891.

Fig. 4.

(No Model.) 6 Sheets—Sheet 6.
J. R. SEVERANCE.
GRAIN BINDER.

No. 452,460. Patented May 19, 1891.

Witnesses:
Theo. L. Popp
Jas. La Croix

Inventor:
James R. Severance
By Geo. B. Selden,
Attorney.

UNITED STATES PATENT OFFICE.

JAMES R. SEVERANCE, OF POUGHKEEPSIE, NEW YORK.

GRAIN-BINDER.

SPECIFICATION forming part of Letters Patent No. 452,460, dated May 19, 1891.

Application filed March 17, 1890. Renewed April 15, 1891. Serial No. 388,990. (No model.)

*To all whom it may concern:*

Be it known that I, JAMES R. SEVERANCE, a citizen of the United States, residing at Poughkeepsie, in the county of Dutchess, in the State of New York, have invented certain Improvements in Grain-Binders, of which the following is a specification, reference being had to the accompanying drawings.

My present invention relates to certain improvements on that type of rear-discharge grain-binders which has been described in my previous patents and applications.

My present improvements are fully described and illustrated in the following specification and accompanying drawings, and the novel features thereof specified in the claims annexed to the said specification.

In the accompanying drawings, representing my present improvement in grain-binders.

In the accompanying drawings, A A represent the longitudinal sills of the frame of the machine; B, the transverse sills; C, the main driving-wheel; D, the cutting apparatus; E, the conveyer-belt; F, the grain-feeder; G, the binding-arm; H, the swinging binder-post; I, the knotter, and J the bundle-discharger arm.

The main driving-wheel C transmits motion to the operating parts of the machine by means of the gear $a$, pinion $b$, and shaft $c$, provided with a bevel-wheel which through a corresponding pinion operates the main driving-shaft $d$. The knives of the cutter-bar D are operated by a crank on the forward end of the shaft $d$ or in any other suitable manner.

In the operation of the machine the grain falling on the platform is conveyed toward the binder mechanism by the conveyer-belt E and elevated through the throat K into the receptacle L, where it is seized by the movement of the binder-arm and carried across the throat to a position over the binding-table, where the cord is tied about the gavel by the operation of the knotter, after which the bound bundle is discharged by the teeth or prongs $ff$ on the bundle-discharger arm J, the bound bundle being delivered in the rear of the machine. The binder-arm G is sustained by the overhung swinging binder-post H, which is operated from the crank $e$ on the forward end of the binder-driving shaft $g$ by means of the link $h\ i$, which also operates the binder-arm through the connection $k$ and crank $l$. The shaft $g$ is driven from the main driving-shaft $d$ by suitable gearing.

The binding-frame consists of suitable transverse bars $m\ m$, connected together by the longitudinal rods or bars $n$, being arranged to be adjusted backward and forward on the main frame of the machine on suitable ways or guides. Provision is made for adjusting the binding mechanism so as to adapt the machine to binding grain of different lengths centrally by means of the lever N, Fig. 1, connected to the binder-frame by a suitable link and provided with a notched segment and catch, by which the binding mechanism is fixed in any desired position relative to the cutter-bar. The binder-frame is provided with a suitable platform to prevent the grain from falling into the machinery beneath it, the said platform being omitted in the drawings for the sake of greater clearness of illustration.

Figure 3:
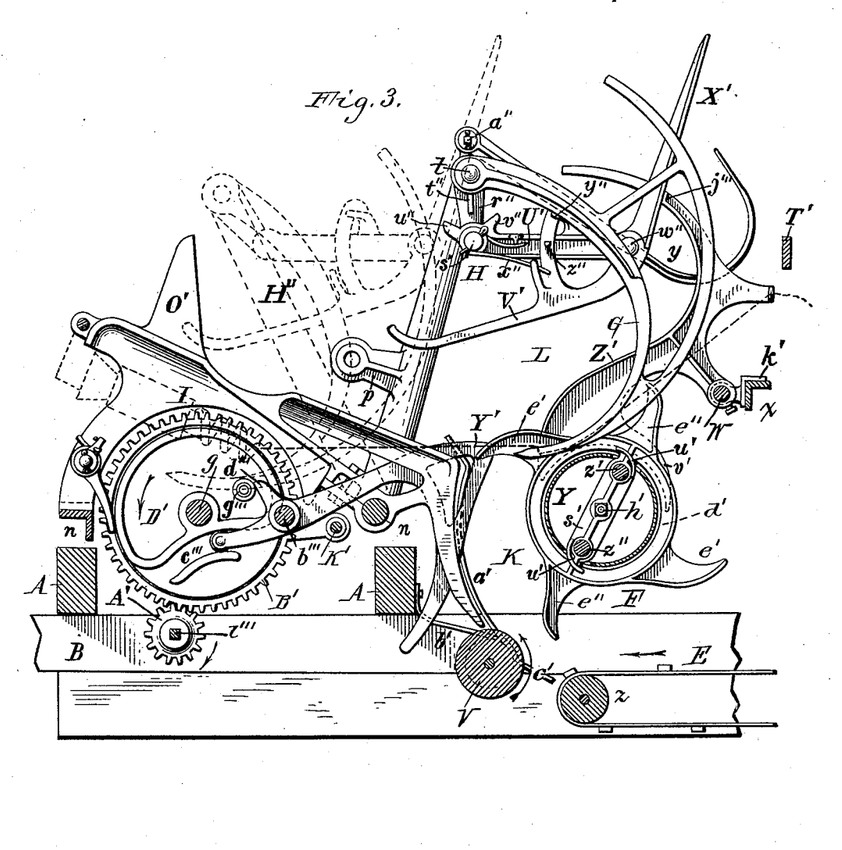
Fig. 3 is a similar section showing the parts in the position which they occupy when the point of the binder-arm is about to cross the throat, and representing also the extreme inward position of the binder-arm by dotted lines.
Figure 4:
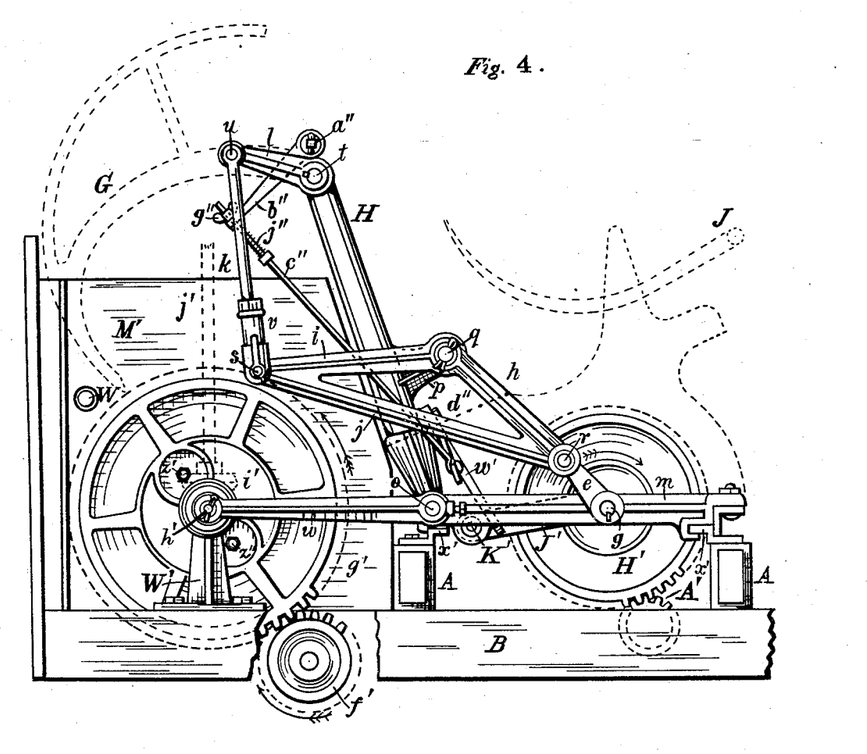
Fig. 4 is a front elevation representing the swinging binder-post and mechanism for operating the same and the binder-arm.

Proceeding now to a description of the mechanism by which the binder-arm is operated, it will be observed from Fig. 4 that the lower end of the overhung binder-post H is pivoted at $o$ on the front corner of the binder-frame, and that it is provided with a projection or arm $p$, carrying a stud $q$, on which the link $h$ is pivoted. The other end of the link is pivoted to the crank-pin $r$ on the crank $e$, which by its revolution imparts a reciprocating motion to the binding-post, as indicated by the full and dotted lines H H'' in Fig. 3. At its upper end the overhung swinging binder-post H carries the shaft $t$, to the rear end of which the binder-arm G is secured. In order to impart the requisite vibrating motion to the binder-arm, the link $h$ is extended beyond the pivot $q$ by an arm $i$, Fig. 4, carrying the pin $s$ at its extremity, on which the lower end of the connection $k$ is pivoted, its upper end being pivoted at $u$ on a stud on the crank $l$, fastened to the forward end of the shaft $t$. The crank $e$ makes one revolution in the direction indicated by the arrow in Fig. 4 for each bundle bound, and the result of the arrangement is that every time the crank $e$ revolves the binder-post swings forward and back over the binding-table, carrying the binder-arm with it, while at the same time the binder-arm makes a vibration, sweeping the grain across the opening of throat K from the gavel-receptacle L to a position over the knotter I, where the band is secured. The lower end of the connection $k$ is threaded into a sleeve $v$, provided with a jam-nut, so that the length of the connection can be adjusted to vary the path traversed by the binder-arm during its vibrations. The point of the binder-arm swings upward, so that it clears any grain in the receptacle during its return movement. The position occupied by the binder-arm when at rest is represented by full lines in Fig. 2, and its position at the extremity of its vibration while compressing the bundle is indicated by the dotted lines in Fig. 3. The links $h\ i$ are connected together by the brace $j$, so as to secure stiffness in the lever with the least weight. The swinging binder-post H may be pivoted on the forward end $o$ of the rod $n$ of the binder-frame. The arm $w$ is also attached to the forward end of the rod $n$ by a set-screw or pin, thus serving to hold the binder-post in place on the rod. The arm $w$ serves to cause the feeding mechanism or a portion thereof to move backward and forward simultaneously with the binder-frame when the latter is adjusted to bind short or long grain centrally of its length. The guides or ways on which the binder-frame slides are represented at $x'\ x'$ in Fig. 4.

Figure 1:
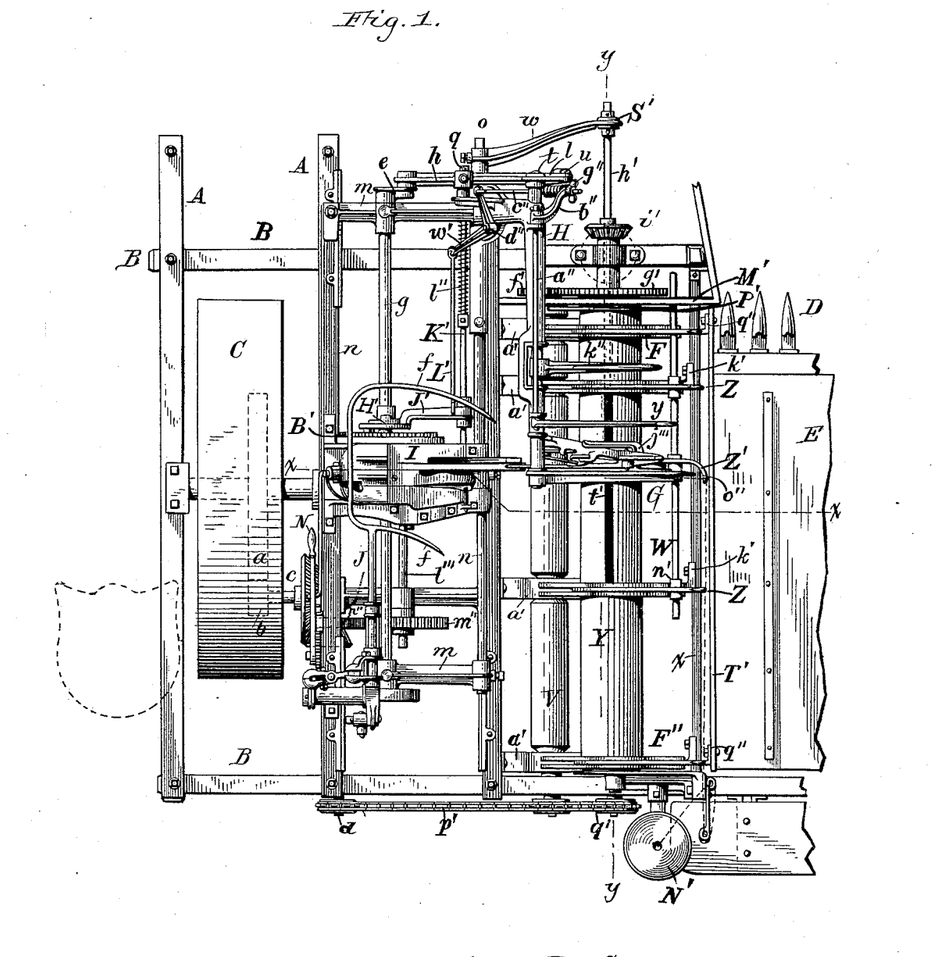
Figure 1 is a plan view, the platform being omitted.
Figure 2:
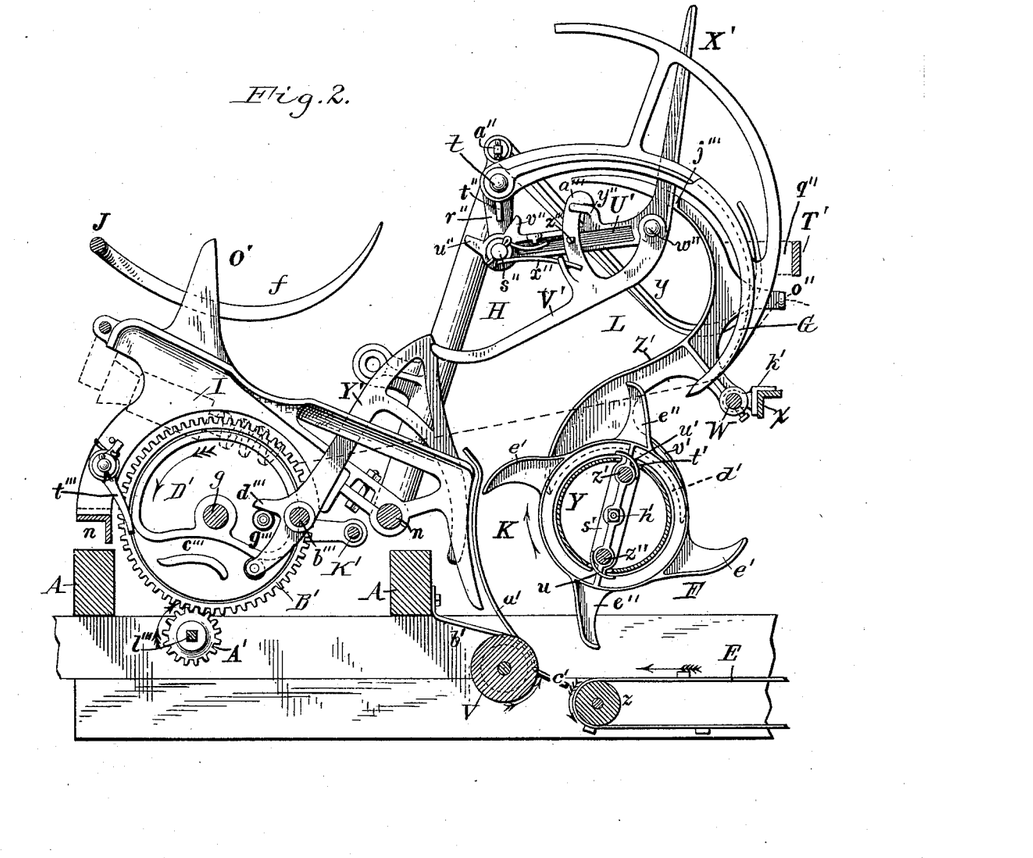
Fig. 2 is a section on the line $x\ x$, Fig. 1, showing the parts in front of said line, the platform and driving-wheel being omitted and the binding-arm and other devices connected therewith being represented in the position they occupy when at rest.

A clutch is provided by which the binding mechanism is automatically thrown into operation by the accumulation of sufficient grain to form a bundle in the gavel-receptacle L, raising the sizing-lever $y$, Figs. 1 and 2. This clutch, which is represented in detail in Figs. 6 to 11, inclusive, serves to connect the main driving-shaft $d$, which runs continuously with the binder-shaft $g$ at the proper time, so that the shaft $g$ makes one revolution and then remains at rest until the next bundle is ready to be bound.

The conveyer E is of any usual or preferred construction. As represented in the drawings, it consists of an ordinary canvas belt provided with transverse slats and running over rollers at each end. The roller $z$ at the end of the conveyer next the binding mechanism is driven from the shaft $d$ by a chain belt and sprocket-wheels, as indicated at $q'\ q'$, Fig. 1, or other suitable devices.

Across the end of the conveyer-belt and parallel therewith is placed the clearance-roller V, which is driven from the shaft $d$ in any convenient manner—as, for instance, by the chain $p'$ and a suitable sprocket-wheel—the direction of its rotation being indicated by the arrow in Fig. 3. At suitable distances along its length the clearance-roller is provided with grooves, in which the lower ends of the spring-guides $a'$ are located, these guides being connected with the frame by the arms $b'$. The lower ends of the spring-guides $a'$ are provided with the projecting fingers $c'$, which receive the grain from the delivery end of the conveyer and prevent its falling onto the ground. The spring-fingers $a'$ extend upward, being given a suitable curved form, and constitute, practically, the outer side of the throat K, through which the grain is carried to the gavel-receptacle by the revolving feeding mechanism F.

The feeding mechanism by which the grain is carried through the throat into the receptacle consists of a series of rims or collars $d'$, provided with the projecting teeth $e'\ e''$, to which motion is imparted by the gears $f'\ g'$ at the forward end of the machine, as represented in Figs. 1 and 4. The pinion $f'$ is secured on the forward end of the shaft of the clearance-roller V and meshes with the gear $g'$, which causes the feeders to revolve. Provision may also be made for driving the reel from the gear $g'$ by means of the bevel-gears $i'$ and the upright shaft $j$.

Figure 5:
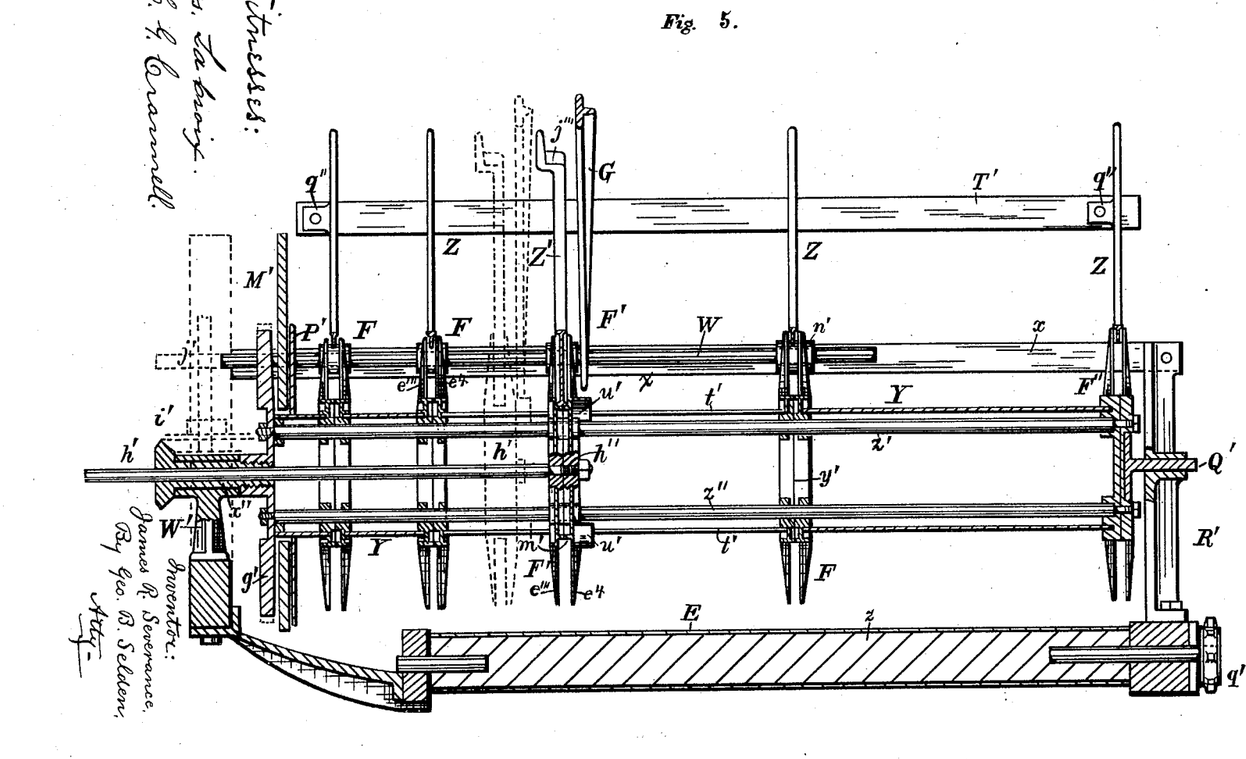
Fig. 5 is a longitudinal section on the line $y\ y$, Fig. 1.

The teeth of the feeders F, as represented at $e'''\ e^4$, Fig. 5, are provided with an opening between them, into which opening the curved clearer-bars Z project, said bars constituting the lower and grain sides of the gavel-receptacle L. The toothed wheels constituting the feeders are preferably cast in pairs, adapted to be attached together, the line of division being indicated at $y'$, Fig. 5.

The lower ends of the points of the clearer-bars travel in a circumferential groove $m'$, Fig. 5, surrounding the rim $d'$, so that the grain cannot become entangled under the points of the clearer-bars. As indicated in Figs. 2 and 3, the clearer-bars are given a suitable curved form, extending upward and inward toward the grain side of the machine and being bent over or recurved at their upper ends, so as to hold the grain in the gavel-receptacle. The clearer-bars are supported by the angle-bar $x$, extending lengthwise of the machine, and which is itself sustained by suitable arms at its ends. The feeders at the forward and rear ends of the feeding mechanism are stationary or non-adjustable lengthwise, while the feeder next to the binder-arm is made adjustable lengthwise of the grain with the binding mechanism, and the corresponding clearer-bar Z' is also made adjustable, being attached to the rod W, which slides through the bosses $n'$ in the other clearer-bars. The clearer-bars Z Z are provided with the feet $k'$, by which they are secured to the angle-bar $x$. At its forward end the rod $h'$ is attached to the binding mechanism by an arm $w$, so that when the binder is shifted lengthwise of the grain the feeder F', Fig. 5, opposite the knotter, is shifted correspondingly. By this construction the feeding of the grain into the receptacle and the passage of the needle-point through the grain are facilitated. The rod $h'$ is secured to the feeder F' at its rear end, as indicated at $h''$, Fig. 5, and at its forward end it revolves in an eye in the end of the arm $w$, being retained longitudinally by the collars S', which are fastened to the rod on each side of the eye. The feeder F' may, however, if preferred, turn on the rod $h'$. The gear $g'$ is supported in a suitable standard W', Fig. 5, at the forward end of the machine by a sleeve $x''$, revolving in the standard, the rod $h'$ sliding freely through an opening in the sleeve. The sleeve may be formed integral with the bevel-pinion $i'$ and its inner end threaded into the boss on the gear $g'$. The gear $g'$ also forms the forward head of the drum or cylinder Y, the rear end of which is formed by the rear feeder F'', provided with a central spindle Q', Fig. 5, which turns in a journal in the bracket R'. The drum is made of sheet metal in sections of suitable length. The heads at the ends of the drum of the feeder are connected together by the rods $z'$ $z''$, on which the adjustable feeder F' slides. The sections of the drums Y fit over flanges on the sides of the rims of the feeders, except on the adjustable feeder, where the rim $d'$, Fig. 3, is outside of the drum, being provided with the arm $s'$, passing through the slots $t'$, having inclined wings or guards $u'$, which prevent the point of the needle-arm from entering the slots. The arm $s'$ is fitted to slide freely on the rods $z'$ $z''$, and the movement of the feeder F' lengthwise of the drum shifts the clearer-bar Z', which slides with the rod W. The revolving feeders are provided with the projecting teeth $e'\ e'\ e''\ e''$, which elevate the grain through the throat K. It will be observed from an inspection of Figs. 2 and 3 that while the acting edges of the teeth $e''\ e''$ are inclined backward from the radial line the edges of the teeth $e'\ e'$ are still more inclined. The object of this arrangement is to facilitate the operation of the binder-arm in carrying the grain from the receptacle to the binding-table, the movements of the feeder and the binder-arm being so timed that the point of the binder-arm always crosses the throat K when one of the teeth $e'$ is traveling upward in the upper part of the throat.

The feeder revolves at one-half of the speed of the shaft $g'$, and the clutch by which the binder-arm is driven has four teeth or points of engagement, so that the parts can be adjusted so that the point of the binder-arm will always cross the throat at the time one of the teeth $e'$ arrives at the upper part of the throat, substantially as indicated in Fig. 3. The teeth $e''$, in consequence of their being more nearly radial, are stronger feeders than the other set of teeth $e'\ e'$. The teeth of all the feeders are constructed like those on the adjustable feeder. The lower part of the adjustable clearer-bar Z' is provided with an arm $v'$, which fits the groove in the rim $d'$, so as to prevent the clearer-bar from being accidentally swung outward toward the binding-table.

The construction and operation of the clutch by which the binding mechanism is actuated will next be described.

Figure 6:
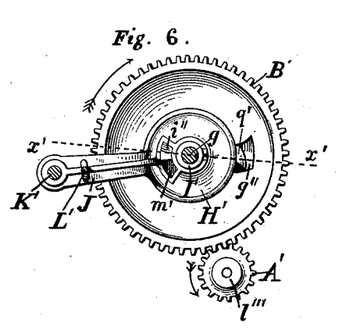
Fig. 6 is a front elevation of the binder-driving gear, showing part of the starting and stopping mechanism.

A', Fig. 6, represents a pinion mounted upon a shaft $l'''$, which is rotated from the main shaft $d$ by suitable intermediate connecting-gears, as shown at $m''\ n''$ in Fig. 1. The shaft $l'''$ is made square for most of its length, so as to slide through a square hole in the hub of the gear $m''$ when the binding mechanism is shifted on the main frame.

B' represents a gear engaging with the pinion A', which gear B' is mounted upon the binder-driving shaft $g$. As indicated in Fig. 1, the pinion and gear are placed immediately in front of the knotter-casing. The gear B' is recessed on its rear side and is provided with a pawl C', secured thereto on a pivot $o'$, Fig. 8.

Figure 7:
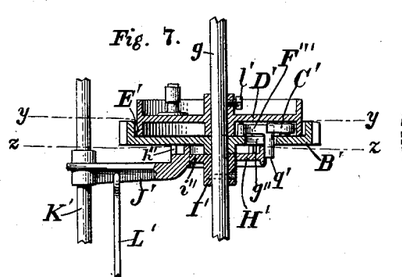
Fig. 7 is horizontal section on line $x'\ x'$, Fig. 6.
Figure 8:
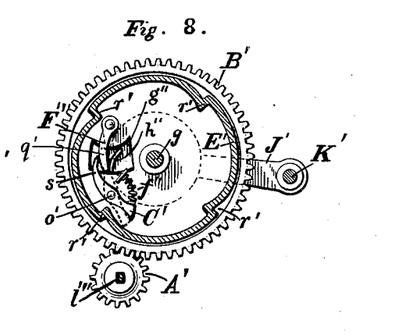
Fig. 8 is a section on line $y\ y$, Fig. 7, looking forward.
Figure 9:
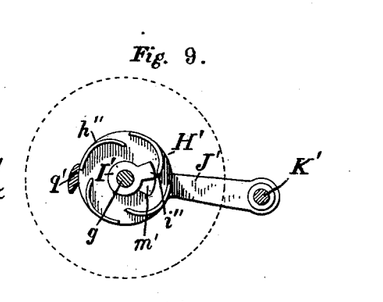
Fig. 9 is a similar section in line $z\ z$, Fig. 7.

D' represents a disk secured to the shaft $g$, Fig. 7, and provided with an annular rib E', Fig. 8, having four ratchet-teeth $r'$. The pawl C' is arranged adjacent to the inner side of the rib E' and is held out of engagement with the ratchet-teeth $r'$ by means of an auxiliary pawl F''', which bears against the tail $s$ of the pawl C', which is thrown into engagement with the ratchet-teeth $r'$ by means of the spring $f''$, Fig. 8. The auxiliary pawl F''' is provided with a forwardly-extending finger $q'$, which projects through a slot $g''$, formed in the gear B', and rests against the periphery of the tripper-disk H'. The latter is mounted loosely on a collar I', secured to the shaft $g$ by a pin $u''$, Fig. 10. The disk H' is provided with an arm J', secured on a guide-rod K', and L' is a rod, which through suitable mechanism connects the arm J' of the tripper-disk H' with the sizing-lever $y$ over the gavel-receptacle, so that when the sizing-lever is raised by the accumulation of sufficient grain in the receptacle the disk H' is shifted lengthwise of the shaft $g$ from the position near the gear B' (represented in Fig. 7) to the position indicated in Fig. 10.

Figure 10:
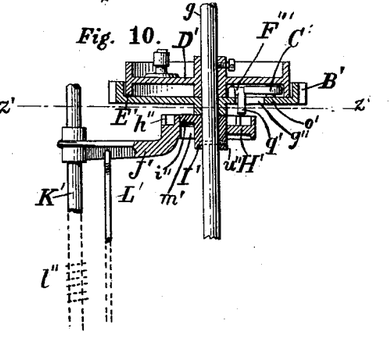
Fig. 10 is a horizontal section of the clutch similar to Fig. 7, showing the tripper-disk withdrawn.

The collar I' is provided with a lateral projecting lug $i''$, which fits into a correspondingly-shaped slot $m'$, formed in the tripper-disk H'. The disk H' slides forward and backward on the collar I', as represented in Figs. 7 and 10. The rear side of the tripper-disk H' is provided with four cams $h''$, Figs. 9, 10, and 11, which force the finger $q'$ outward to the periphery of the tripper-disk H' whenever the latter has been released and allowed to move up to the gear B'. During the time that the revolving feeding-teeth feed the grain into the gavel-receptacle the disk D' remains stationary, and the gear B', carrying the pawl C', disengaged from the ratchet-rim E', is revolved by the pinion A', as shown in Figs. 2, 3, and 6.

Figure 11:
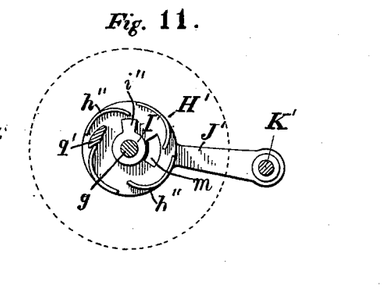
Fig. 11 is a section similar to Fig. 9 on the line $z'\ z'$, Fig. 10.

When a sufficient quantity of grain has been fed into the gavel-receptacle, the gavel operates the sizing-lever $y$, which is connected with an elbow-lever $w'$, Figs. 1 and 4, attached to the end of the rod L' and draws the tripper-disk H' forward, releasing the finger $q'$ of the auxiliary pawl F''' from its bearing on the edge of the disk H', thereby allowing the spring $f''$ to force the pawl C' into engagement with some one of the ratchet-teeth $r'$ on the rim E', which causes the disk D' to revolve in unison with the gear B'. The disk D', being secured to the shaft $g$, causes the latter by the connecting mechanism to move the oscillating post carrying the binder-arm forward and backward and also to operate the knotter. When the disk H' is drawn forward, it releases the lug $i''$ from the recess $m'$, and by the revolution of the shaft $g$ the lug $i''$ is carried forward opposite to the surface of the disk H' and prevents the disk from being returned toward the gear B' by the action of the spring $l''$ until the binder has completed one revolution and the lug $i''$ has returned opposite to the slot $m'$. When the disk H' is withdrawn from its position near the gear B', the auxiliary pawl F''' swings inwardly, which causes the finger $q'$ of the latter to stand directly opposite the series of cams $h''$, formed on the rear side of the disk H', as shown in Fig. 11, and when the disk H' is forced rearwardly again after the shaft makes one revolution one of the cams $h''$ next adjacent to the finger $q'$ engages with it and forces the latter gradually outward until it again bears on the periphery of the disk H', around which it continues to travel until again released by the withdrawal of the disk H'. In this position the pawl C' is disengaged from the ratchet teeth and the disk D' remains stationary. When the finger $q'$ of the auxiliary pawl bears on the periphery of the disk H' and has withdrawn the pawl C' from the ratchet-rim E', the motion of the latter and the shaft $g$ is discontinued. It is necessary to make the slot $m'$ somewhat elongated, thereby permitting the lug $i''$ to enter the slot and continue to move with the shaft $g$ a sufficient distance to enable the cams $h''$ to move the pawl-finger $q'$ of the pawl F''' outward, and consequently throw off the pawl C' from the ratchet E'. If the pawl C' happen to drop in behind a ratchet-tooth, there may be nearly a quarter-revolution of inactive movement, and the swinging post of the binder-arm remains stationary until the pawl C' strikes the next ratchet-tooth $r'$. This arrangement enables me to properly time the movement of the binder-arm and the inclined feeding-teeth $e'$, as already described. The guide-rod K' slides in suitable ways on the binder-frame.

The movement of the sizing-lever is transmitted to the disk H' in the following manner: The sizing-lever $y$ is attached to a rock-shaft $a''$, Figs. 1 and 4, supported in suitable journals on the binder-arm post H, and the rock-shaft $a''$ has fastened to it at its front end an arm $b''$, to which the rod $c''$ is connected, the lower end of which is pivoted to the elbow-lever $w'$, which in its turn is pivoted to the rod L', which is fastened to the arm J', carrying the disk H'. From an inspection of these parts, as shown in Fig. 1, it will be observed that when the grain in the receptacle raises the free end of the sizing-lever $y$ this motion will be communicated to the disk H', so as to move the latter forward, thus engaging the clutch and setting the binding mechanism in operation. The elbow-lever $w'$ is pivoted to the side of the binder-arm post at $d''$. The rod $c''$ is provided with an adjusting-nut $g''$ and a spring $j''$, bearing against the collar on the rod, by which the sizing-lever $y$ may be set so as to make any desired size of bundle.

At the front end of the grain-receptacle is placed the end board M'. Immediately behind the end board is placed the revolving butt-disk P', which revolves with the feeders and assists in feeding the butts of the grain by avoiding the friction which would occur against a stationary end board. The butt-disk is made of a size to correspond with the throat, so that its front end is entirely closed by a moving surface, which travels at the same speed as the feeders. The binding-cord is carried in a suitable box N', Fig. 1, from which it passes through a suitable tension device and the guide-eye $o''$ to the point of the needle-arm and thence to the knotter I, which is of a construction similar to that shown in my patent, No. 382,773, and pending application, Serial No. 362,010. The knotter is inclosed within a suitable casing, which is supported on the binder-frame, being provided with a slot in which the point of the binder-arm works. The casing has an upwardly-projecting horn or detent O', against which the grain is carried by the binder-arm, and which assists in the formation of the bundle during the compressing operation.

The bundle-discharger J is arranged to deliver the bound bundle in the rear of the machine, being constructed as shown and described in my previous patents and pending applications, and in my application, Serial No.

292,245, filed November 30, 1888, in particular. The construction of the bundle-compressor is represented in Figs. 1, 2, and 3. An arm or bracket $r''$, Figs. 2 and 3, on the rear end of the binder-arm post is provided with a stud $s''$, on which the compressor-carrying arm $U'$ is pivoted, provision being made for limiting the vibration of the arm $U'$ on the stud by means of the stop $t''$ and the lugs $u''$ $v''$.

The arm $U'$ extends toward the grain side of the machine, being provided with a stud $w'''$, on which the compressor $v'$ is pivoted, and with an extension $X'$, which projects upward at a suitable angle. The compressor $V'$ extends over the gavel-receptacle, being held down against the grain therein by a spring $x''$, and provision being made for limiting its movement on the stud $w''$ by the stop $y''$ on the arm $U'$ and the lugs $z'''$ $a'''$. The spring $x''$ is coiled one or more times around the stud $s''$, and one of its ends bears against a lug or projection on the arm $U'$ and the other against a notch or recess in the compressor $V'$. The grain is held down in the gavel-receptacle by the compressor, which assists in the compression of the bundle in the binding-chamber above the knotter. The grain as it is fed upward through the throat K crowds the cord, which extends from the knotter to the eye in the point of the binder-arm, as indicated by the dotted line in Fig. 2, upward into the receptacle, and the bundle is entirely surrounded by the cord by the movement of the binder-arm. The compression of the bundle is finally completed by the binder-arm and the compressor, as indicated by the dotted lines in Fig. 3, against the horn or detent $O'$ on the knotter-casing. The clearer-bar $Z'$ is provided with an offset $j'''$, Figs. 1, 2, and 4, against which the extension $X'$ of the compressor-carrying arm $U'$ rides near the end of the return movement of the binder-arm post, thereby causing the compressor $V'$ to take its proper position over the grain-receptacle.

The construction and operation of the side compressor $Y'$ are substantially the same as shown in my pending application Serial No. 217,390. It is pivoted at $b'''$ and operated by a cam-groove $c'''$ on the side of the disk $D'$, the return motion being secured by the pin or roller $g'''$ striking against the lug $d'''$, so as to give the side compressor a quick movement downward. The side compressor is shown in the different positions it occupies at the ends of its vibration in Figs. 2 and 3. The edge of the side compressor passes between the teeth of the feeders, so that the latter strip the grain from it on both sides as they travel upward.

$k''$, Fig. 1, represents a butt-hook keyed on the binder-arm shaft $t$, so as to oscillate with the binder-arm. It is made of the same general form as the needle-arm, but is somewhat shorter, and serves the purpose of pulling the butts of the grain over into the binding-chamber. The binder-arm post is recessed to permit of the attachment of the butt-hook to the shaft $t$.

$t'''$, Fig. 2, is a spring-pawl, which prevents a backward movement of the binding mechanism.

The post which supports the rear ends of the feeding mechanism may be bent outward to afford room for the passage of the heads of long grain.

I claim—

1. The combination, with the grain-conveyer of a grain-binder, of the adjustable revolving feeder $F'$, located at the delivery end of the conveyer and operating to feed the grain upward through a throat or passage-way, the grain-receptacle on the inner side of the throat and the binding-chamber on the outer side, adjustable binding mechanism provided with the vibrating and traveling binding-arm adapted to carry the grain across the throat from the grain-receptacle to the binding-chamber, and suitable connecting mechanism whereby the simultaneous adjustment of the feeder and the binding mechanism is secured, substantially as described.

2. The combination, with the grain-conveyer of a grain-binder, of a compound revolving grain-feeding mechanism consisting of an adjustable feeder $F'$ and a non-adjustable feeder $F$, located at the delivery end of the conveyer and operating to feed the grain upward through a throat or passage-way, the grain-receptacle on the inner side of the throat and the binding-chamber on the outer side, adjustable binding mechanism provided with a binding-arm adapted to carry the grain across the throat from the grain-receptacle to the binding-chamber, and suitable connecting mechanism whereby the simultaneous adjustment of the adjustable feeder and the binding mechanism is secured, substantially as described.

3. The combination, with the grain-conveyer of a grain-binder, of the adjustable revolving feeder $F'$, located at the delivery end of the conveyer and operating to feed the grain upward through a throat or passage-way, the grain-receptacle on the inner side of the throat and the binding-chamber on the other side, adjustable binding mechanism provided with a binding-arm adapted to carry the grain across the throat from the grain-receptacle to the binding-chamber, the connecting-arm $w$, and rod $h'$, substantially as described.

4. The combination, with the grain-delivery throat of a grain-binder, of the continuously-revolving feeder $F$, provided with feeding-teeth $e'$ $e'$ $e''$ $e''$, projecting into the throat, having acting edges inclined backward at different inclinations, substantially as described.

5. The combination, with a grain-delivery throat, of a continuously-revolving feeding mechanism provided with feeding-teeth having acting edges inclined backward, and a binding-arm arranged to pass through the stream of grain at the time it is being advanced by a feeding-tooth of the greatest inclination, substantially as described.

6. The combination, with the grain-delivery throat of a grain-binder, of a continuously-revolving grain-feeding mechanism consisting of a series of two or more feeders F F', provided with feeding-teeth of different inclination, one of the said feeders being adjustable lengthwise, while the other is non-adjustable, substantially as described.

7. The combination, with the grain-delivery throat of a grain-binder, of an adjustable binding mechanism adapted to receive the grain from the throat, and a continuously-revolving grain-feeding mechanism consisting of a series of two or more feeders provided with feeding-teeth of different inclinations, one of said feeders being adjustable lengthwise simultaneously with the binding mechanism, while the other is non-adjustable, substantially as described.

8. The combination, with the grain-delivery throat of a grain-binder, of suitable adjustable binding mechanism and a continuously-revolving grain-feeding mechanism consisting of a series of two or more feeders F F', mounted on the same axis, one of which is adjustable lengthwise of the axis simultaneously with the binding mechanism, while the other or others are non-adjustable, and the adjustable clearer-bar Z', substantially as described.

9. The combination, with the grain-delivery throat of a grain-binder, of suitable adjustable binding mechanism, and a continuously-revolving grain-feeding mechanism consisting of a series of two or more feeders F F', mounted on the same axis, one of which is adjustable lengthwise of the axis simultaneously with the binding mechanism, while the other or others are non-adjustable, and the spring finger or fingers $a'$, located on the opposite side of the throat and opposite the non-adjustable feeder or feeders, substantially as described.

10. The combination, with the grain-delivery throat of a grain-binder, of suitable adjustable binding mechanism, the grain-receptacle L', the continuously-revolving feeding mechanism consisting of a series of two or more feeders F F', mounted on the same axis, one of which is adjustable lengthwise of the axis simultaneously with the binding mechanism, while the other or others are non-adjustable, and the clearer bar or bars Z, substantially as described.

11. The combination, with the non-adjustable revolving grain-feeder F, of the adjustable revolving feeder F' and drum Y, substantially as described.

12. The combination, with the non-adjustable revolving grain-feeder F, of the adjustable revolving feeder F', drum Y, and supporting-rods $z'$ $z''$, substantially as described.

13. The combination, with the revolving adjustable grain-feeder F', provided with guards $u'$, of the slotted drum Y and the adjustable binding-arm G, substantially as described.

14. The combination, with the revolving adjustable grain-feeder F', of non-adjustable feeder or feeders F, drum Y, and revolving butt-disk P', substantially as described.

15. The combination, with the traveling and vibrating binder-arm G, of the compressor-carrying arm U', having extension X', spring-compressor V', and the clearer-bar Z', having offset $j'''$, substantially as described.

16. The combination, with the overhung swinging binder-post H, of the binder-arm G, shaft $t$, crank-arm $l$, connection $k$, link $h$ $i$, and revolving crank $e$, substantially as described.

17. The combination, with the binder-arm G, of the overhung swinging binder-arm post H, provided with arm $r''$, the compressor-carrying arm U', the compressor V', pivoted to the support U' and provided with spring $x''$, and suitable stops, substantially as described.

18. The combination, with the adjustable binding mechanism provided with the traveling and vibrating binder-arm G, arranged to carry the grain from the grain-receptacle to the binding-chamber, of the vibrating side compressor Y' and the adjustable feeder F', substantially as described.

19. The combination, with the adjustable binding mechanism provided with the traveling and vibrating binder-arm G, arranged to carry the grain from the grain-receptacle to the binding-chamber, of the vibrating side compressor Y', the upper compressor V', and the adjustable feeder F', substantially as described.

20. The combination, with the adjustable binder-frame $m$ $n$, supporting a binding mechanism comprising the overhung swinging binder-arm post H, carrying the binder-arm G, adapted to carry the grain from the grain-receptacle to the binding-chamber, of a continuously-revolving grain-feeding mechanism containing one or more non-adjustable feeders, and an adjustable feeder connected with the binding mechanism by the axially-arranged rod $h'$ and arm $w$, substantially as described.

JAMES R. SEVERANCE.

Witnesses:
GEO. B. SELDEN,
C. G. CRANNELL.